(12) United States Patent
Fuchs et al.

(10) Patent No.: US 9,805,622 B2
(45) Date of Patent: Oct. 31, 2017

(54) PHYSICAL LUNG MODEL TO SIMULATE ORGAN FUNCTION IN HEALTH AND DISEASE

(75) Inventors: Roman Fuchs, Maienfeld (CH); Mario Fuchs, Maienfeld (CH)

(73) Assignee: ORGANIS GMBH (CH)

( * ) Notice: Subject to any disclaimer, the term of this patent is extended or adjusted under 35 U.S.C. 154(b) by 154 days.

(21) Appl. No.: 14/118,533

(22) PCT Filed: May 16, 2012

(86) PCT No.: PCT/CH2012/000109
§ 371 (c)(1),
(2), (4) Date: Nov. 18, 2013

(87) PCT Pub. No.: WO2012/155283
PCT Pub. Date: Nov. 22, 2012

(65) Prior Publication Data
US 2014/0099621 A1    Apr. 10, 2014

(30) Foreign Application Priority Data
May 16, 2011    (CH) .......................................... 814/11

(51) Int. Cl.
G09B 23/28    (2006.01)
(52) U.S. Cl.
CPC .................................. G09B 23/288 (2013.01)
(58) Field of Classification Search
CPC ............................... G09B 23/28; G09B 23/288

USPC .................................................. 434/372, 272
See application file for complete search history.

(56) References Cited

U.S. PATENT DOCUMENTS

| 5,584,701 A * | 12/1996 | Lampotang | A61B 5/1106 434/262 |
| 7,959,443 B1 * | 6/2011 | Frembgen | G09B 23/32 434/262 |
| 2008/0305464 A1 | 12/2008 | Lynn | |

FOREIGN PATENT DOCUMENTS

DE    102009030819 A1    1/2011

* cited by examiner

*Primary Examiner* — Xuan Thai
*Assistant Examiner* — Robert P Bullington
(74) *Attorney, Agent, or Firm* — Morris O'Bryant Compagni Cannon, PLLC

(57) ABSTRACT

The invention relates to a lung simulator apparatus, as well as to a method to ventilate a lung simulator with a ventilator. The lung simulator apparatus comprises an air chamber with a variable volume for an exchangeable gas, which air chamber is connected in parallel with two air conduits, and a gas exchange element for injecting a tracer gas into the air chamber, wherein the volumes of the air conduits are substantially different. The method of simulating lung function comprises filling a first gas into the air chamber, which has a variable volume and which is connected in parallel with the two air conduits, and injecting a second gas into the air chamber, pressing the first and second gas out of the air chamber, and optionally repeating these steps.

27 Claims, 4 Drawing Sheets

PHYSICAL LUNG MODEL TO SIMULATE ORGAN FUNCTION IN HEALTH AND DISEASE

CROSS-REFERENCE TO RELATED APPLICATIONS

Figure 1:
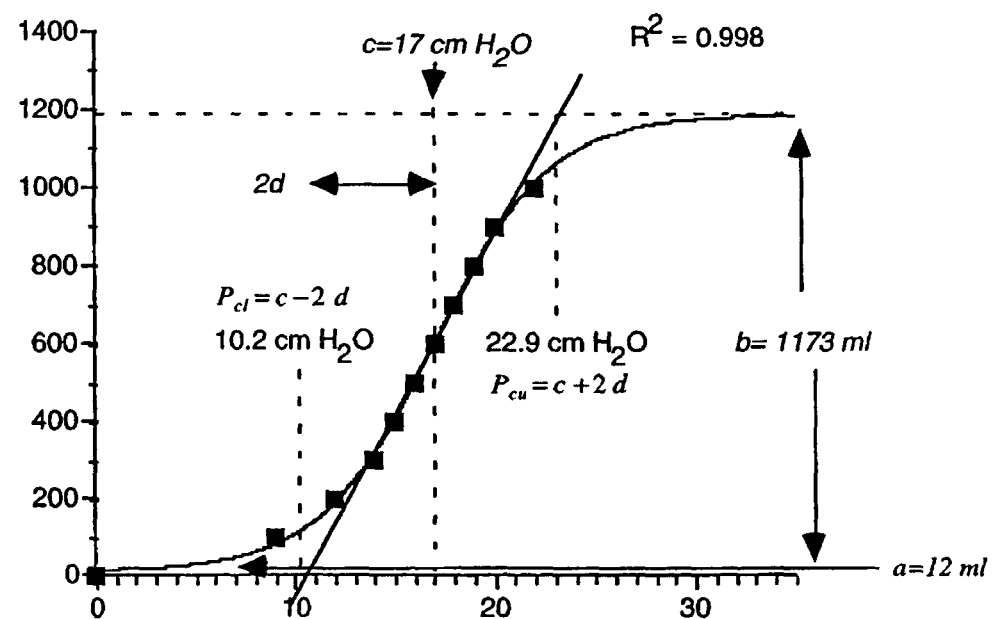

This application is a national phase entry under 35 U.S.C. §371 of PCT/CH2012/000109 filed May 16, 2012, which claims priority to Swiss Patent Application No. 814/11 filed May 16, 2011, the entirety of each of which is incorporated by this reference.

The present invention relates to a heart-lung simulator for testing and training purposes.

STATE OF THE ART

Clinicians who treat patients on mechanical ventilation are trained on lung simulators that offer poor resemblance of the functionalities of patients they are about to treat. For this reason, animals are used to provide more realistic physiological response. This physiologic response involves at least the following capabilities: different diseases by combining variable dead space, non-linear lung mechanics, spontaneous breathing, heart-lung interaction (cardio-pulmonary interaction), and passive respiration. For example, pulmonary embolism changes dead space, exhaled carbon dioxide concentration, stiffness of the lung, and blood gases simultaneously.

Currently, there are device on the market which allow partial simulation (METI, Laerdal, ASL5000), but none of them provides a comprehensive patient model which is put into action by virtue of the supplied hardware. Training of mechanical ventilation for intensive care personnel is therefore still often done in animals.

US application 2008/0305464 A1 for example discloses a resuscitation system for the administration of cardiopulmonary resuscitation of asthma patients, and for teaching the cardiopulmonary resuscitation of asthma patients to simulate the cardiovascular and gas exchange effects of dynamic hyperinflation and to train healthcare workers to detect the adverse cardiovascular effects of dynamic hyperinflation. In one embodiment the system comprises two lungs connected to a bifurcated rigid trachea via identical bilateral variable resistance airway tubes, wherein the airway tubes comprise flexible resistance regions, by which variable airway resistance can be adjusted for exercise purposes. For the purpose of simulating a variable airway resistance an airway is surrounded by an inflatable balloon, which when inflated constricts the airway.

For the reasons described above there is a clear need for a physical lung model that is developable or capable to simulate not only respiratory mechanics but also respiratory gas exchange and lung-heart interaction in active and passive patients.

It is an advantage of this invention to improve apparatuses comprising a lung simulator in such a way that training of clinical ventilation can be accomplished without the need for animals. Another advantage is to provide a lung model for use in testing applications for ventilators, anesthesia machines, and CPAP devices.

Physiological Basis of the Invention and its Conversion into the Simulation of Physiology The basis of the invention is given by physiology and patho-physiology. The human lung is situated inside a more or less rigid enclosure (chest wall), is ventilated via its airways by virtue of expansion of the lung through respiratory muscles, exchanges gas with the blood that is pumped through the alveolar spaces and thereby moves carbon dioxide ($CO_2$) out of and oxygen ($O_2$) into the arterial blood, and exerts pressure on the heart thereby influencing the blood pressure. The quality of gas exchange depends on fresh gas reaching the lung spaces as well as on the overall lung volume, particularly the area available for gas exchange (functional residual capacity, FRC). Generally, with large airways, only a fraction of fresh gas reaches the lungs.

An apparatus with a physical lung model or lung simulator that incorporates realistic simulation essentially includes means to simulate all elements described in the following. This includes airways of variable volume to which a respiratory device can be connected, several expandable lung compartments to simulate pulmonary mechanics, at least one respiratory muscle compartment, one or several transfer elements from muscle to lung, a heart element that is coupled to the lung compartments, a gas exchange element to simulate carbon dioxide production and oxygen consumption, and physical access to measure blood pressure and blood gases, such as arterial blood gases. Oxygenation needs to be made dependent on both, measured levels of end expiratory lung volume ($V_{Lee}$) and measured levels of oxygen concentration within the expandable lung compartments.

Airways to which a Respiratory Device can be Connected

Airways are simulated by simple flexible tubes, for example silicon, on one end attached to an expandable lung compartment, on the other end connected to the port of a ventilator. The size of said tubing represents non-gas exchanging space (dead space, Vd) and the resistance of said tubing represents said airways resistance ($R_{aw}$). Generally, resistance can be expressed as the pressure difference between airway opening ($P_{aw}$) and lung ($P_L$), i.e.

$$R_{aw} = (P_{aw} - P_L)/\text{Flow} \quad [1]$$

Airways do not exchange gas with blood. It is therefore important that, for example, $CO_2$ is not entered via the airways but via the air chambers. Gas not taking part in the lung gas exchange is termed "dead space" or Vd.

Expandable Lung Compartments to Simulate Pulmonary Mechanics

The expandable lung compartments can be simulated, for example by silicon bellows that are attached to said laboratory tubing. Said expandable lung compartment can be made of elastic material, for example silicon, and should have a high compliance, for example 200 ml/hPa. In another implementation, a moveable piston within a cylinder can be used. To create a counter pressure that simulates normal and diseased lungs, an external force generator, for example an electro-dynamic motor (voice coil), can be used to push against the expansion of the lung compartment. The advantage of a voice coil is that its force is proportional to the electric current flowing through the coil. Alternatively, a linear motor can be used. The pressure of the voice coil ($P_{vc}$), can be expressed in function of the voice coil current ($i_{vc}$) and the area on which the force acts.

$$P_{vc} = k \cdot i_{vc}/A_L \quad [2]$$

where k is a constant for the particular voice coil used.

If said electric current is made dependent on the volume inside the lungs $V_L$, then the elastic properties of the lungs can be modeled and the above expression becomes:

$$P_{vc} = k \cdot i_{vc}(V_L)/A_L \quad [3]$$

Pressure $P_{vc}$ needs to be corrected for the pressure created by the elastic properties of said expandable lung compartment. For this purpose, the current needed to expand said expandable lung compartment needs to be measured at ambient pressure, i.e. with the airways open to atmosphere. The relationship between current $i_{corr}$ and volume will give the calibration curve for the expandable compartment in use:

$$i_{corr}=\text{function of volume}=i_{corr}(V_L) \quad [4]$$

and finally, the equation to drive the motor becomes:

$$P_L=k*(i_{vc}(V_L)+i_{corr}(V_L))/A_L \quad [5]$$

To simulate human curvilinear respiratory mechanics, the pressure $P_L$ inside said expandable lung compartments must increase with the total volume inside the lungs $V_L$ as follows:

$$P_L=V_L/C_{rs} \quad [6]$$

where $C_{rs}$ is the compliance of the total respiratory system, in ml/hPa, and is for the adult between 20 and 100 ml/hPa. $C_{rs}$ is composed of two parts, the lung part ($C_L$) and the chest wall part ($C_w$), connected in series.

Now, given a total respiratory compliance of $C_{rs}$, and measuring the volume that entered the expandable compartment, for example by means of a displacement sensor, the current necessary to produce the correct mechanical property can be calculated as follows:

$$k*(i_{vc}(V_L)+i_{corr}(V_L))/A_L=V_L/C_{rs} \quad [7]$$

and $i_{vc}(V_L)$ can be calculated as $$i_{vc}(V_L)=A_L/k*V_L/C_{rs}-i_{corr}(V_L) \quad [8]$$

Therefore, with this calibrated design, the elastic properties of lung and chest wall can be simulated without need for feedback control, flow sensor, or pressure sensor. Such a system is inherently stable and can be used as a basis for the implementation of the next elements by linear superposition.

Respiratory Muscle Compartment and Transfer Element

The respiratory muscle compartment is simulated by using said linear motor or voice coil coupled to the expandable lung compartment by virtue of a mechanically attached rod. Adding or subtracting electrical current to the said linear motor or voice coil simulates muscular activity ($P_{musc}$) as a function of time (t) in the following way:

$$P_L=V_L/C_{rs}+P_{musc}(t) \quad [9]$$

For the electrical circuit, this means:

$$k*(i_{vc}(V_L,t)+i_{corr}(V_L))/A_L=V_L/C_{rs}+P_{musc}(t) \quad [10]$$

and $i_{vc}(V_L,t)$ can be calculated thereof as $$i_{vc}(V_L,t)=[V_L/C_{rs}+P_{musc}(t)]*A_L/k-i_{corr}(V_L) \quad [11]$$

where $P_{musc}(t)$ is a predefined function, for example a square wave with slope a. The amplitude is to simulate the overall effort, the slope a is to model "respiratory drive", see below. Enhancing the model with $P_{musc}(t)$ will permit, for time example, the assessment of the response time of an attached respiratory support device.

In the adult, $P_{musc}$ is controlled by the respiratory center in the brain. The urgency and need to breathe is called "respiratory drive". A high respiratory drive creates a rapid change in $P_{musc}$, a low respiratory drive creates a slow change in $P_{musc}$. Typical pressure values for $P_{musc}$ within the first 100 ms (=0.1 s) from the start of a breathing effort ($P_{0.1}$) are changes of 8 to 10 hPa for a normal and 1-8 hPa for a weak inhalation. Such spontaneous breathing can be superimposed on the passive characteristic by adding the time course of pressure to the equation.

Non-linear Compliance and Lung Volume

In the above equations, $C_{rs}$ is a constant. However, in a real lung, $C_{rs}$ in not constant but depends on the lung volume $V_L$ (Venegas et. al. 1998, for a graph of the Venegas equation see FIG. 1):

$$V = a + \left(\frac{b}{1+e^{-(P-c)/d}}\right)$$

Based on this Venegas equation $C_{rs}$ can therefore be described as a sigmoid function as follows:

$$V_L/C_{rs}=c-d*\ln(b/(V_L-a)-1) \quad [12]$$

Where a is the residual volume within the lungs, sometimes called functional residual capacity FRC, c is the point of maximal curvature, d is the dispersion or "width" of the sigmoid curve, and b is the lung volume above the residual volume at full expansion.

Substituting $V_L/C_{rs}$ by equation 12, equation 11 can be rewritten as:

$$i_{vc}(V_L,t)=[c-d*\ln(b/(V_L-a)-1)+P_{musc}(t)]*A_L/k-i_{corr}(V_L) \quad [13]$$

A normal adult lung has a residual volume (FRC), i.e. the volume at the end of exhalation, of about 2500 to 3500 ml. In disease, this volume deviates from normal. It can be as low as 700 ml in acute respiratory distress syndrome (ARDS) or as high as 7000 ml in chronic obstructive lung disease (COPD).

To simulate FRC, or the factor a in the Venegas equation, the current through the voice coil $i_{vc}$ can be biased as follows:

$$i_{vc}(V_L,t)=[c-d*\ln(b/(V_L-a)-1)+P_{musc}(t)]*A_L/k-i_{corr}(V_L+a-V_{RC}) \quad [14]$$

where $V_{RC}$ is the volume within the bellows when they are fully compressed.

This lung can further be expanded by airway pressures that exceed a certain recruitment threshold. Such recruitment will lead to an effective increase in FRC.

Gas Exchange $CO_2$ production is simulated by adding pure $CO_2$ into the expandable lung compartment with a mass-flow controller, yielding $V'_{CO2}$ in ml-STPD/min. To create a realistic $CO_2$ curve it is essential to add the inflowing $CO_2$ gas to the air chambers rather than to the airways. It is further important to take the $CO_2$ buffering capacity of the human body and blood compartments into account if, for example, the lungs are insufficiently ventilated and the human body is capable of storing large amounts of $CO_2$. The $CO_2$ influx may be made dependent on the above factors and the actual ventilation of the air chambers to simulate the buffering effect of the human body.

The level of $CO_2$ in the blood depends on alveolar ventilation and this in turn on dead space ventilation according to the simple equation V'A=MV−Vd. Vd can be simulated by adding tubing to the airways of the lung model. However, automatic adjustment of such dead space volume is not trivial since the transition from fresh gas to alveolar gas needs to be clearly defined, for example by geometry. Therefore, the implementation of automatic changes in dead space is essential to realistically simulate human respiration in health and disease but a solution has not been disclosed yet.

Oxygenation of the arterial blood depends on the alveolar oxygen partial pressure and the lung volume relative to the expected lung volume. Between 0 and 100 mmHg of $P_{O2}$, the saturation varies, typically between 0 and 100% saturation (Bigeleisen). Above 100 mmHg $P_{O2}$, the saturation is dependent only on the relationship between actual $V_L$ and predicted FRC ($FRC_{pred}$), reaching 100% for a ratio of 1. If actual $V_L$ becomes larger, saturation does no longer increase. Therefore, the formula to calculate oxygen saturation of the arterial blood needs two inputs: Measured $P_{O2}$ in the lungs and actual end-expiratory lung volume $V_{Lee}$. $P_{O2}$ can be measured, for example by a fuel cell. $V_{Lee}$ is the end expiratory value of measured $V_L$.

$$S_{aO2} = \min(P_{O2}/100, 1) * \min(V_{Lee}/FRC_{pred}, 1) * 100 \quad [15]$$

with $P_{O2}$ in mmHg. Note that both terms of the equation need to be truncated at 1, i.e. the minimal value of both terms within the parenthesis is taken.

$S_{aO2}$ values are simulated by an assembly of LEDs and optical filters that simulate the optical absorption of oxyhemoglobin at different levels of saturation by means of a pulse oximetry simulator.

While equation 15 provides a first and sufficient approximation of the physiology for the purpose of simulation, the present invention allows far more elaborate modeling of oxygenation.

Oxygenation of blood in the alveolar capillaries depends on the alveolar oxygen partial pressure and the diffusion into the alveolar capillaries. The oxygen saturation in the alveolar capillaries $S_c$ depends on the actual measured $P_{O2}$ and a diffusion limiting factor which can be described as the partial pressure at which the blood is completely saturated, $P_{diff}$. A possible relationship can be expressed as $$S_c = 100 * \min(P_{O2}/P_{diff}, 1) \quad [15a]$$

Other published formulas can be used alternatively, for example the one proposed by Severinghaus, J. W. Simple, accurate equations for human blood $O_2$ dissociation computations (J Appl Physiol. 46(3): 599-602. 1979). In any case, capillary blood saturation $S_c$ is proportional to actual partial pressure of oxygen in the lungs $P_{O2}$ divided by the partial pressure of oxygen $P_{diff}$ at which pressure diffusion is large enough to fully saturate the arterial blood. However, saturation cannot exceed the maximum value of 1, therefore, $S_c$ must be limited to 1. The function "min" in the above equation describes such limitation.

The capillary blood will be diluted on the way to the arteries by blood that was not oxygenated. In healthy persons such "dilution" is very small, i.e. in the order of 1-2%. In sick persons, this dilution is much larger and is referred to as "venous admixture". The amount of venous admixture can be expressed in a commonly known equation, the so called shunt equation:

$$Q_s/Q_t = (C_c - C_a)/(C_c - C_v) \quad [15b]$$

where $Q_s$ is the ml/min of blood not exchanging gas with the lung, $Q_t$ is the total blood flow, $C_c$ is the oxygen content of the capillary blood, $C_a$ is oxygen content of the arterial blood, and $C_v$ is the oxygen content of mixed venous blood. $C_c$, $C_a$, and $C_v$ can be approximated by oxygen saturation ($S_c$, the oxygen saturation in the capillaries, $Sa_{O2}$, the oxygen saturation in the arterial blood, $S_v$, the oxygen saturation in the venous blood) since only a small fraction of oxygen is physically dissolved in the blood. The majority of oxygen is bound chemically but reversibly to hemoglobin. The above equation can therefore be rewritten as:

$$Q_s/Q_t = (S_c - S_{aO2})/(S_c - S_v) \quad [15c]$$

Oxygen uptake $V'_{O2}$ is reflected in the blood by the approximative equation $$V'_{O2} = Q_t * (S_{aO2} - S_v)/100 \quad [15d]$$

and $S_v$ can be calculated thereof as $$S_v = S_{aO2}/100 - V'_{O2}/Q_t \quad [15e]$$

Combining the above equations yields the following expression for $S_{aO2}$ $$S_{aO2} = (S_c/100 - Q_s/Q_t * (S_c/100 + V'_{O2}/Q_t))/(1 - Q_s/Q_t) * 100 \quad [15f]$$

Oxygen uptake and $CO_2$ production are closely related to each other by a term called "respiratory quotient". If this respiratory quotient is 1, then $CO_2$ production $V'_{CO2}$ and oxygen consumption $V'_{O2}$ can be equated.

$S_c$ can be substituted by the equation 15a.

$Q_s/Q_t$ is often proportional to the quotient of end expiratory lung volume $V_{Lee}$ and expected lung volume $FRC_{pred}$.

For alveolar partial pressures between 0 and 100 mmHg, the capillary saturation $S_c$ varies between 0 and 100% saturation (Bigeleisen). Above 100 mmHg $P_{O2}$, the saturation is dependent mainly on the amount of venous admixture $Q_s/Q_t$.

$Q_s/Q_t$ increases with progressive lung collapse, i.e. with decreasing lung volume $V_{Lee}$ relative to predicted lung volume ($FRC_{pred}$). Thus the following equation approximates the dependency of $Q_s/Q_t$ on lung volumes:

$$Q_s/Q_t = \max(1 - V_{Lee}/FRC_{pred}, 0) \quad [15g]$$

where the function "max" means that $Q_s/Q_t$ can only assume positive values between 1 and 0.

Now, the oxygen saturation of the arterial blood $S_{aO2}$ can be calculated according to equation 15f by substitution of $S_c$ with equation 15a and $Q_s/Q_t$ with equation 15g, given the model input parameters $Q_t$, $V'_{O2}$, and $FRC_{pred}$, and the measured parameters $V_{Lee}$ and $P_{O2}$.

As a corollary result, the model can also output the $Q_s/Q_t$ ratio.

Heart Element Coupled to Lung

The heart element consists of software in a central processing unit, which software assesses the impact on the circulation by measurement and mathematical projection. The effect of ventilation on the heart is a result of the actions of a patient's breathing muscles or an external ventilator, the mechanical properties of the lungs and chest wall, and the degree of respiratory muscle activity. During mechanical ventilator treatment the model itself cannot determine this combined effect by mathematical simulation since, by definition, the attached ventilator is an unknown entity. Therefore, the theoretical lung pressure $P_L$, as defined above, cannot serve as indicator of the effect on hemodynamics. Rather, actual measurement of the pressure within the compressible compartments ($P_{bellows}$) is needed along with the value for chest wall compliance $C_W$. $C_W$ remains fairly normal even in disease and has been reported to be around 120 ml/hPa, unless the chest wall is severely deformed or mechanically restricted. With the measured level of $P_{bellows}$ and $C_W$, the pleural pressure can then be calculated as follows:

$$P_{pl}(t) = P_{bellows}(t) - V_L(t)/C_W \quad [16]$$

$P_{cardio}(t)$, the low-pass filtered version of $P_{pl}(t)$, can be calculated as follows:

$$P_{cardio}(t) = P_{cardio}(t-dt) + z_{lh} * (P_{pl}(t) - P_{cardio}(t-dt)) \quad [17]$$

with $z_{lh} = dt/(RC_{lh} + dt)$ and $RC_{lh}$ being the time constant of the lung-heart transfer function or the time constant with which the lung pressure impacts the blood pressure. With $P_{cardio}(t)$ known, the instantaneous effect of the actual lung pressure on the actual amplitude of the pulse oximeter plethysmogram ($A_{PO}(t)$), can be calculated in accordance to the commonly used definition of $POP_v = (POP_{max} + POP_{min})/(POP_{max} - POP_{min}) * 100$ and as follows:

$$A_{PO}(t - T_{delay}) = (POP_v + 1)/(POP_v - 1) * P_{cardio}(t) \quad [18]$$

Where $POP_v$ is the Pulse-Oximetry Plethysmogram variation as determined by the users and/or the pathological model chosen (see Table 1), and $T_{delay}$ is the time it takes the cardio-circulatory system to react to intrapulmonary pressure changes.

SUMMARY OF THE INVENTION

The object of this invention is achieved by an apparatus according to independent claim 1.

In one embodiment the object of this invention is accomplished by providing a physical lung simulator apparatus comprising
at least a first air chamber with a variable volume for an exchangeable gas,
at least two air conduits, namely a first air conduit and a second air conduit, whereof at least the first air conduit is connected to the first air chamber,
wherein
the volumes of the two air conduits are substantially different, and
at least a first gas exchange element is connected with a first end to the first air chamber for injecting a tracer gas into the first air chamber.

The provision of two or more air conduits having different volumes has the advantage that physiological conditions can be simulated much more realistically than with conventional simulators. Due to the different volumes of the air conduits the initial rise of the tracer gas is less steep during exhalation than in the case where only one conduit is provided. Thus, the simulator may be designed such that, e.g. two air conduits of different volumes emanate from the same air chamber (in particular e.g. according FIG. 3). Alternatively or in addition the simulator can be designed such that at least one of the at least two air conduits emanates from a first air chamber and at least one of the at least two air conduits emanates from a second air chamber (in particular e.g. according FIG. 4). It is also possible to have 2, 3 or more air conduits, all of them of different volumes, being connected to the same air chamber. By the provision of 2, 3 or more air conduits it is possible to further influence the rise in the tracer gas concentration during exhalation.

Essentially, the at least one or first air chamber is connected in parallel with the at least two air conduits.

Advantageously, the apparatus comprises or is connected to a tracer gas source, such as e.g. a gas bottle filled with tracer gas.

The apparatus may comprise an element, in particular a mass flow controller, e.g. valve, for effecting and/or controlling the tracer gas injection into the at least one air chamber.

The volumes of the at least two air conduits may differ by at least 1 ml, by at least 10 ml, by at least 20 ml, by at least 50 ml, or by at least 100 ml.

Advantageously, in one embodiment the first and the second air conduits are connected to the first air chamber. Expressed in other words, the first air chamber is connected with the airway tube (being the common or main tube possibly to be connected further with e.g. a ventilator) in parallel via the first and the second air conduits.

Advantageously, in another embodiment a second air chamber with a variable volume for an exchangeable gas is provided, wherein the first air conduit is connected to the first air chamber and the second air conduit is connected to the second air chamber. Expressed in other word, the first and the second air chambers are connected with the common airway tube in parallel via the first and the second air conduits (meaning that from each of at least a first and a second air chamber emanates at least one air conduit).

A second gas exchange element may be provided, whereas the first gas exchange element is connected with a first end to the first air chamber and the second gas exchange element is connected with a first end to the second air chamber for injecting a tracer gas into the first air chamber and the second air chamber.

The apparatus may comprise an element, in particular a mass flow controller, e.g. a valve, for effecting and/or controlling the tracer gas injection into any of the air chambers, in particular into the first and/or the second air chamber.

The volume of the air conduits emanating from (i.e. connected to) the first air chamber may differ from the volume of the air conduits emanating from (i.e. connected to) a second air chamber by at least 1 ml, by at least 10 ml, by at least 20 ml, by at least 50 ml, or by at least 100 ml. The volume of the air conduits emanating from one air chamber is the sum of the volumes of each air conduit emanating from the same air chamber.

The ratio of the volume of the air conduits emanating from a first air chamber to the volume of the air conduits emanating from a second air chamber may be in the range of 1:1.1 to 1:2.

Effectively, where several air conduits emanate from a first and or a second air chamber the sum of the volumes of the air conduits emanating from the same air chamber is taken into account. Hence, the sum of the volumes of the air conduits emanating from one air chamber may differ from the sum of the volumes of the air conduits emanating from another air chamber by at least 1 ml, by at least 10 ml, by at least 20 ml, by at least 50 ml, or by at least 100 ml.

Advantageously the air conduits merge to form a common air tube, possibly with an opening at the end of the common air tube. Usually one opening at the end of the common air tube is possible.

The volumes of the air conduits and/or the volume of the air tube may be adjustable. For example the length of the air conduits and/or air tube may be changed, for example using bellow type or corrugated air conduits and/or air tubes.

Advantageously, the air conduits are essentially non-elastic, essentially non-deformable and/or essentially dimensionally stable. In particular, the material of the air conduits is essentially non-elastic, non-deformable and/or dimensionally stable.

Any one of above apparatuses may further comprise at least one sensor for analyzing gas passing through the common air tube. Optionally the apparatus further comprises a measuring or evaluating unit for receiving and evaluating the output of the sensor.

It is advantageous that the at least one gas exchange element comprises a tube or a structure; whereas said structure e.g. allows penetration of an injecting device.

Furthermore it is advantageous that the element for effecting and/or controlling the tracer gas injection comprises a valve and/or an injecting device, such as e.g. a syringe.

The tracer gas is a gas other than air, in particular other than oxygen and other than nitrogen. The tracer gas is for example carbon dioxide ($CO_2$).

Advantageously mechanical actuator means are provided for acting on the air chambers and thus for increasing or reducing the volume of the first and or second air chamber.

Furthermore, the object of this invention is achieved by a method according to independent claim 15 or 16.

In a respective embodiment the object of this invention is accomplished by providing a method of simulating physical lung function comprising
   a. filling a first gas via at least two air conduits into at least one air chamber, which has a variable volume, and injecting a second gas into the at least one air chamber,
   b. pressing the first and second gas out of the at least one air chamber via the at least two air conduits, and
   c. optionally repeating steps a and b,
   wherein
   at least two air conduits of substantially different volumes are provided, and
   at least a second gas is injected into the at least one air chamber.

Thus, the initial increase of the tracer gas in the exhaled gas stream is less steep and accordingly close to physiological conditions. The method of simulation, e.g. is applied to a simulator which is designed such that at least two of the at least two air conduits emanate from the same air chamber (in particular e.g. according FIG. 3). Alternatively or in addition the method of simulation, e.g. is applied to a simulator which is designed such that at least one of the at least two air conduits (thus a first air conduit) emanates from a first air chamber and at least another of the at least two air conduits (thus a second air conduit) emanates from a second air chamber (in particular e.g. according FIG. 4).

In yet a further respective embodiment the object of this invention is accomplished by providing a method of simulating physical lung function comprising
   a. filling a first gas via at least a first air conduit into a first air chamber and via at least a second air conduit into a second air chamber, which chambers have a variable volume, and injecting a second gas into the first air chamber and/or the second air chamber,
   b. pressing the first and second gas out of the at least two air chambers, and
   c. optionally repeating steps a and b,
   wherein
   the first air conduit and the second air conduit of substantially different volumes are provided and
   at least a second gas is injected into at least the first air chamber.

Figure 4:
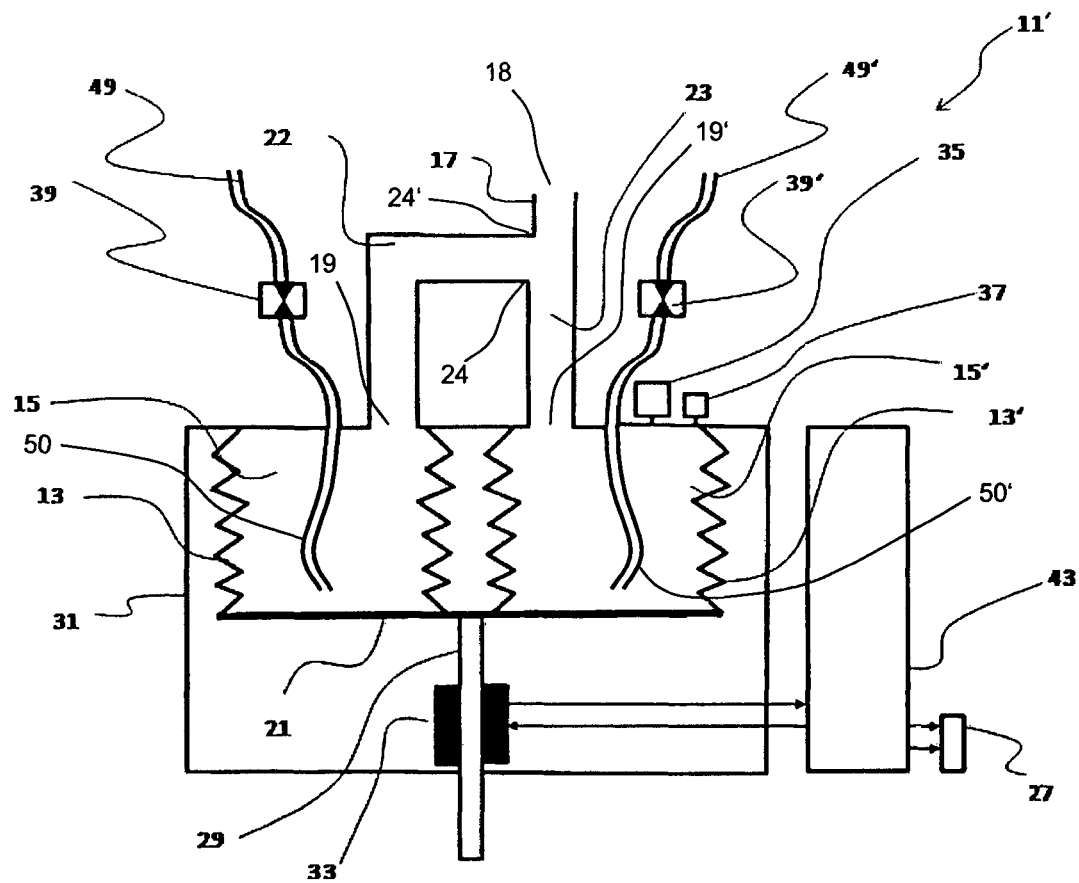

Thus, the method of simulation, is applied to a simulator which is designed such that at least one of the at least two air conduits (thus a first air conduit) emanates from a first air chamber and at least another of the at least two air conduits (thus a second air conduit) emanates from a second air chamber (in particular e.g. according FIG. 4). Optionally in addition, the simulator is designed such that at least two air conduits emanate from at least one of said at least two air chambers.

Advantageously in an air chamber (e.g. in the first and/or the second air chamber) the volume of the first gas is at least two times the volume of the second gas; or the volume of the first gas is at least ten times the volume of the second gas.

The first gas may be air (which is actually a gas mixture). Optionally said first gas comprises oxygen or a mixture of oxygen and nitrogen. Said first gas, in particular said mixture, may comprise at least 15 vol.-% oxygen, or at least 20 vol.-% oxygen.

The second gas may be a tracer gas. The second gas may be an inert gas, such as e.g. carbon dioxide ($CO_2$), sulfur hexafluoride ($SF_6$), noble gases such as helium or argon.

Advantageously the tracer gas is introduced, e.g. injected or pumped, into the air chamber in a continuous manner. Advantageously, in order to simulate a physiological condition tracer gas is introduced into the air chamber in an amount from 50 to 750 ml per minute, or 150 to 350 ml per minute. The tracer gas may be introduced continuously into the air chamber while the air chamber is expanded and compressed alternately.

Advantageously said first gas or gas mixture comprises less than 1 vol.-% of said tracer gas, or less than 0.1 vol.-% of said tracer gas. The first gas or gas mixture may be essentially free of said tracer gas.

It is advantageous that a processing unit simulates and applies a pressure to the air chambers as a function of time and/or volume of the air chambers. Contracting or expanding force is applied onto the air chambers by means of an actuator, which actuator may be controlled by said processing unit. Said processing unit may be designed to take account of data collected by the measuring unit.

Advantageously the gas passing through the common air tube is analyzed. The composition of the gas may be determined, such as the partial pressure of the tracer gas may be measured.

With above described physical lung simulator apparatus one or two lungs may be represented by one or two air chambers, respectively. Moreover, bronchial tubes and airways as well as the trachea are represented by the air conduits and the air tube, respectively. An asymmetric branching of the bronchial tubes of different cross sectional diameters is represented by air conduits of differing volumes.

DESCRIPTION OF THE INVENTION

An apparatus comprising a mechanical lung simulator is encompassing, as known from the state of art, an air chamber with a volume of a gas or a gas mixture in an expandable air compartment and has adaptable operating conditions for a simulation of different lung conditions. Further it has a sensor means for measuring values of physical parameters related to the gas or gas mixture, a central processing unit configured to receive the output of the sensor means to calculate the success of the ventilator intervention depending on the output of the sensor means and based on actual values of physiological parameters defining a patient's condition.

According to the present invention the central processing unit of such apparatus is configured to calculate a change of values of said physiological parameters depending on the values measured with the sensor means and based on a physiological model defining dependencies between the physical and the physiological parameters. Furthermore, the calculated parameters are transformed into physical manifestations such as change in lung volume, change in pressures, or change in parameters that represent haemodynamic properties such as blood pressure and arterial oxygenation.

The physiological model may encompass several pathological models. A pathological model has specific ranges of values of certain parameters and has specific dependencies between the physical and the physiological parameters.

Such calculation of a change of said values forms a basis for an adaptation of the operation conditions. Such adaptation of operation conditions may be achieved by automated adjustments. Such calculation of a change prepares the apparatus to be ready for clinical training purposes and execute realistic clinical scenarios.

The central processing unit may be configured to control and automatically adapt the operating conditions of the lung simulator according to said calculated change of the values of the physiological parameters. By that, the physiology of the patient can be simulated for training. This simulation of the patient's response is, of course, depending on the physiological model, more specifically of a chosen disease or pathological model. The response of the patient depends on the treatment. Since trainees can in fact respond completely differently to any given patient, the physiological model must not force such response but react either positively or negatively to such treatment, as the case may be. The evaluation of the trainees' response will ultimately be up to the trainer who will evaluate trainee performance based on the patient's condition achieved during or after the treatment. Such response is not predictable but will depend on the interaction between physiological model and treatment, usually done with a mechanical ventilator or an anesthesia machine.

For the simple connection of the apparatus with a mechanical ventilator or anesthesia machine, the air chambers of the mechanical lung simulator have air conduits connecting said air chambers with an airway adapter. Such airway adapter is connectable to a ventilator to be tested or used training. For a simulation of a human lung, the apparatus has one, two, or more air compartments. The air compartments have compartment volumes expandable by introducing a gas through the airway adapter into the air chamber and are connected to the airway adapter with air conduits of different volume each.

To simulate different dead space volumes, $CO_2$ is injected at points of different volumes measured from said injection point up to the airways. In principle, the closer the point of $CO_2$ injection is located towards the airway opening, the smaller the dead space. However, in particular breath patterns, a constant influx of $CO_2$ may create backpressure and thereby create smaller dead spaces than set. For this reason, at least two expandable lung compartments are connected with each other by virtue of air conduits of different volumes, for example lung compartment A (15') with a tube of 50 ml volume and lung compartment B (15) with a tube of 100 ml volume. Both compartments are moved in synchrony and at the same rates by virtue of the joint bottom of the bellows (21). If $CO_2$ is injected into lung compartment A, the complete dead space VD amounts to 100 ml, because $CO_2$ will appear at the junction of the two tubes as soon as $CO_2$ contained in the small tube is washed out. Since there is no $CO_2$ in compartment B, all gas from compartment B will add to dead space. If $CO_2$ is injected only into lung compartment B, VD becomes 200 ml for the same reasons.

For the simulation of a $CO_2$ production and output of a lung the air chamber has a $CO_2$-inlet connected to a tube comprising an electrically controllable valve, which tube is connected to a $CO_2$-supply. Together with the provision of such features, the central processing unit is configured to control said valve according to the physiological model. The position of the $CO_2$-inlet is rather crucial to create a physiologic response. Ideally, such response is a sigmoid $CO_2$ curve if measured against time or volume. To create such response it is essential to connect the $CO_2$ inlet to one of the alveolar chambers rather than to the tubing that simulates the airways. The connection may be done at the opposite end of the alveolar chamber relative to the airways.

The apparatus, for a simulation of different compliances and/or the active breathing and/or different lung recruitment (gain in lung volume), is advantageously provided with a mechanical pressure means for acting, depending on the situation, with a contracting or expanding force onto the air compartment. Whether the mechanical pressure means acts with a contracting or an expanding force onto the air compartment is a matter of the control by the central processing unit and of the physiological model deposed therein, on the basis of which the reactions of the simulated patients are calculated.

One main reason to have a reaction or change of a trainee's response is the cardio-pulmonary reaction of the simulated patient. Therefore, such reaction may be calculated dependent on the measured values and based on the physiological model, that the calculated values of at least one cardio-pulmonary parameter is presented with a cardio-vascular interface.

Apart from serving as a simulator for training, such apparatus allows testing of mechanical ventilators used in medicine that take into consideration within their closed loop software the cardio-vascular impact of the mechanical ventilation and optimize the ventilation mode, if such impact seems to demand such adaptation.

A cardio-vascular interface of that kind is advantageously adapted for an attachment of an ordinary vascular sensor sensing at least one of the cardio-pulmonary parameters presented by the cardio-vascular interface. This allows using the sensor provided with the ventilator to be tested or a respective vital signs monitor. The cardio-vascular interface therefore may be configured to present simulated circulation parameters, such as the saturation of the arterial blood, the pulse, the pulse amplitude, the pulse amplitude variation. The cardio-vascular interface may present an output containing the instantaneous or delayed effect of the actual lung pressure on the actual amplitude of the blood pressure. Even more specifically the output of the cardio-vascular interface may be modulated in such a manner, that it induces in a pulse oximeter a realistic pulse oximeter plethysmogram, calculated according to the cardio-pulmonary relationship defined in the actual chosen disease or patient's condition of the physiological model.

The cardio-vascular interface may be an artificial finger device or body device. This allows the connection of an ordinary pulse oximeter to said artificial body device. Alternatively, a display device can be connected and the simulated parameters can be displayed.

The sensor means of such apparatus may comprise at least one of the following sensors:
a first pressure sensor, for measuring the pressure of the gas in the air chamber;
a second pressure sensor, for measuring the pressure of the gas at the airway adapter of the air chamber;
an oxygen sensor, for measuring the oxygen content of the gas in the air chamber;
a displacement sensor, for measuring an actual volume change of the air chamber, possibly integrated in a motor producing such displacement;
a position sensor for measuring an actual compartment volume of the air chamber.

The force of the mechanical pressure means acting on the air compartment is advantageously electrically controllable. Together with an electrically controllable mechanical pressure means the central processing unit is configured to control the force of the mechanical pressure means according to the physiological model. This allows an adaptation of the actual force with which the pressure means acts on the air compartment in a real time manner and a simulation of the compliance and of an active participation of the patient in the breathing work, as well as e.g. of a recruitment of additional lung or an action of the patient that is working against the ventilator and the like. To achieve this electrical controllability the mechanical pressure means includes an electrical motor, specifically a linear motor, more specifically a voice coil, which motor is cooperating with the air compartment. The compliance $C_W$ of the chest wall is simulated by the mechanical pressure means acting on the air compartment with a force calculated under consideration of a value of $C_W$ and controlled by the central processing unit.

If an airway resistance shall be simulated, a flow restrictor can be provided between the airway adapter and the air compartment. If the above-mentioned second pressure sensor is provided, it is situated between the airway adapter and the flow restrictor. The central processing unit may be configured to control an opening width of said flow restrictor.

The cardio-pulmonary parameters presented at the cardiovascular interface are advantageously mathematically linked to the measured values, which are dependent on the action of the ventilator to be tested and selectable values of lung parameters of the physiological model. Such mathematical link may be based on the following equations:

$$S_c = 1/(23,400/(P_{O2}^3 + 150 \cdot P_{O2}) + 1)$$

$$S_{aO2} = (S_c/100 - Q_s/Q_t \cdot (S_c/100 + V'_{O2}/Q_t))/(1 - Q_s/Q_t) \cdot 100$$

Where $P_{O2}$ is the partial pressure of oxygen measured inside the air compartment, $S_c$ is the oxygen saturation of capillary blood, $Q_s$ is the mixed venous blood that bypasses the lungs, $Q_t$ is the total blood flow, and $V'_{O2}$ is the oxygen consumption of the patient.

The effect of intrapulmonary pressure on the cardiovascular pressures may be modeled by the following equation:

$$P_{cardio}(t) = P_{cardio}(t-dt) + z_{lh} \cdot (P_{pl}(t) - P_{cardio}(t-dt)),$$

whereas $P_{cardio}(t)$ is the portion of the gas pressure in the air chamber that is estimated to have an impact on the blood pressure, as a function of time, $P_{cardio}(t-dt)$ is the difference between an actual value of $P_{cardio}$ and its previous value, $z_{lh}$ is a factor representing a time constant with which pleural pressure impacts the blood pressure, and $P_{pl}(t)$ is the pleural pressure as a function of time. The pleural pressure $P_{pl}$ as a function of time may be calculated to be the pressure in the air chamber $P_{bellows}$ as a function of time reduced by the quotient of the volume of the air chamber $V_L$ divided by the compliance $C_W$ of the chest wall.

The cardio-vascular interface is controlled to present an output containing the instantaneous effect of the actual lung pressure on an actual amplitude of the blood pressure, an amplitude of said output being calculated according to following equation:

$$A_{PO}(t - T_{delay}) = (POP_v + 1)/(POP_v - 1) \cdot P_{cardio}(t)$$

wherein $A_{PO}(t-T_{delay})$ is the actual amplitude of the output, delayed by a certain time $T_{delay}$, which is due to cardio-circulatory effects, $POP_v$ is the variation of the pulse amplitude simulated with the output, and $P_{cardio}(t)$ is that portion of the gas pressure in the air chamber that is estimated to have an impact on the blood pressure as a function of time.

The central processing unit is configured to adapt the pressure/volume relationship in the air compartment according to the physiological model by a mathematically calculated adaptation of the force acting on the air compartment by the mechanical pressure means. It may more specifically be configured to adapt the volume/pressure relationship according to a mathematical equation representing physiology, e.g. a non linear sigmoid function as published by Venegas (Venegas equation). In the case that the volume/pressure relationship is adapted according to a Venegas equation, the mathematical calculation fulfills the following equation:

$$V = a + \left(\frac{b}{1 + e^{-(P-c)/d}}\right)$$

The object of the present invention is further achieved by ventilating with a medical ventilator or an anesthesia machine an air chamber of a mechanical lung simulator. The operation conditions of this mechanical lung simulator are simulating specific lung conditions. During said ventilation values of physical parameters of the gas or gas mixture are measured within an expandable air compartment of the air chamber. Success of the ventilation is calculated dependent on the measured values, the actual expansion of said air compartment, and based on actual values of physiological parameters, which parameters are defining the patient's condition. Further the calculated success is indicated.

Such method is, according to the invention, further characterized by a) calculating a change of values of the physiological parameters dependent on the measured values, which calculation is based on a physiological model defining the dependencies between the values of the physical and the physiological parameters. Such dependencies may be defined in one way and another, each way defining a specific disease or pathological model that can by chosen. The progress of the disease process can further be simulated by adapting the way the dependencies of the parameter are defined and the parameters are adapted over time.

Therefore the operation conditions of the lung simulator may be automatically adapting according to said calculated change of values of the physiological parameters. The changes of the parameters related to the pressure in the cardio-vascular system are to be calculated dependent on the pleural pressure. This method may further be characterizes by a step of changing a compressing force as a function of time acting onto the expandable air compartment. Such compressing force can have the value 0. It may also take a negative value, so that it is an expanding force. It is further contemplated to act with a contracting or expanding force of a mechanical pressure means onto the volume of the air compartment for influencing the simulated behavior of the lung of the patient. Specifically a linear motor, e.g. a relatively cheap voice coil, cooperating with the air compartment is activated.

Further the $CO_2$ release into the air chamber is changed according to the physiological model. The location where CO2 is actually input is important in order to create a realistic $CO_2$ curve. The actual volume of $CO_2$ produced is controlled by a valve dosing the flow of $CO_2$ into the air chamber or air chambers according to the physiological model.

In one embodiment the method comprises calculating changing values of at least one cardio-pulmonary parameter as a function of time dependent on the measured values as a function of time and based on the physiological model. The changing values of the cardio-pulmonary parameter are presented with a cardio-vascular interface. Such values of circulation parameters as a function of time are calculated based on actually measured values like pressure in the air chambers. The calculation may encompass the oxygen saturation of the arterial blood, the pulse, the pulse amplitude, the pulse amplitude variation. Such values, presented with a cardio-vascular interface, are determined to be read with a pulse oximeter as used together with ventilator to be tested or presented during a teaching of students. Therefore one may connect a pulse oximeter of the ventilator to an artificial body device (such as an artificial finger device) and to present the calculated values as a function of time by said artificial body device. Alternatively, a display unit can be used to indicate the calculated values.

At least one of the following parameters is measured:
The pressure of the gas in the air chamber;
the pressure of the gas at a mouthpiece of the air chamber;
the oxygen content (partial pressure of $O_2$) of the gas in the air chamber;
an actual volume change of the air chamber;
an actual compartment volume of the air chamber;
the amount of $CO_2$ flowing through an inlet into the air chamber or the partial pressure of $CO_2$ in the air chamber.

An opening width of a flow restrictor between an airway adapter and an expandable air compartment of the air chamber of the mechanical lung simulator may be controlled by the central processing unit.

Cardio-pulmonary parameters are calculated based on actually measured parameters. A base for such calculation is the physiological model. A second base is formed by the measured values, which are depending on the actual operating condition of the lung simulator and the action of the ventilator set by the trainee. Said calculated cardio-pulmonary parameters are presented with the cardio-vascular interface. The instantaneous effect of the actual lung pressure on the actual amplitude of the blood pressure is calculating in real time. With the CPU the output of the cardio-vascular interface is controlled according to this real time calculation.

The following equation is used for such calculation:

$$P_{cardio}(t) = P_{cardio}(t-dt) + z_{lh} * (P_{pl}(t) - P_{cardio}(t-dt))$$

whereas $P_{cardio}(t)$ is the portion of the gas pressure in the air chamber that is estimated to have an impact on the blood pressure as a function of time and is derived from the measured values of the gas pressure in the air chamber, $P_{cardio}(t-dt)$ is the difference between an actual value of $P_{cardio}$ and its previous value, $z_{lh}$ is a factor representing a time constant with which pleural pressure impacts the blood pressure and is based on parameters adaptable according to the specific patient condition to be simulated, and $P_{pl}(t)$ is the pleural pressure as a function of time, derived from a measured value of the gas pressure in the gas chamber.

The pleural pressure $P_{pl}$ as a function of time can be calculated dependent on the pressure measured in the air chamber $P_{bellows}$ as a function of time reduced by the quotient of the volume of the air chamber $V_L$ divided by the chosen compliance $C_W$ of the chest wall. A chosen compliance $C_W$ of the chest wall can be simulated by controlling the force of the mechanical pressure means acting on the expandable air compartment of the air chamber as a function of time. This compliance can be set by the trainer to simulate different clinical conditions with their own impact on cardio-pulmonary interaction.

The output of the cardio-vascular interface is modulated, so that it induces in a pulse oximeter connected to the cardio-vascular interface a pulse oximeter plethysmogram. The amplitude of the output can be calculated according to following equation:

$$A_{PO}(t-T_{delay}) = (POP_v+1)/(POP_v-1) * P_{cardio}(t)$$

wherein $A_{PO}(t-T_{delay})$ is the actual amplitude of the output, delayed by a certain time $T_{delay}$, $POP_v$ is the variation of the pulse amplitude simulated with the output, and $P_{cardio}(t)$ is that portion of the gas pressure in the air chamber that is estimated to have an impact on the blood pressure as a function of time. Another means to indicate the effect of ventilation on hemodynamics is to simply display the calculated values.

An adapted pressure/volume relationship in the air chamber as a function of time is calculated based on the physiological model, and the force acting on the expandable air compartment of the air chamber is adapted by the mechanical pressure means according to said calculation.

For simulating a patient's condition values of a plurality of the following parameters of the physiological model may be chosen according to a pathological model or healthy physiological conditions:

$C_W$, a compliance of the chest wall,
$V'_{CO2}$, an amount of $CO_2$ produced in the air chamber
a level of hemodynamic stability,
$P_{0.1}$, a respiratory activity,
form and amplitude of $P_{musc}(t)$, the pressure on the lung compartment of the respiratory muscles as a function of time,
$a_{min}$ and $b_{min}$, two minimal Venegas parameters,
optional c and/or d, further Venegas parameters
$P_{threshold}$, at least one collapse/recruitment threshold,
$RC_{lh}$, a time constant representing the time between a lung pressure change and its impacts on the blood pressure
$RC_c$, a time constant representing the time necessary for a lung volume to collapse when PEEP is below $P_{threshold}$ or to expand when PEEP is higher than $P_{threshold}$;
$FRC_{pred}$, a functional residual capacity to be expected with a healthy lung of a certain size.
$T_{delay}$, a time it takes the cardio-circulatory system to react to intrapulmonary pressure changes,
Vd a volume of dead space,
Cr, at least one recruitment factor
HR, the heart rate Advantageously the chosen values of the plurality of parameters as a function of time, and eventually also as a function of measured values, then are changed. Such change is depending on the action of the ventilator to be tested and on the chosen values of the plurality of parameters.

Such method as well as such apparatus may be used for testing a medical ventilator. It may further be used as a teaching instrument, for demonstration of patient's behavior or response to ventilation and so on.

SHORT DESCRIPTION OF THE DRAWINGS

Figure 2:
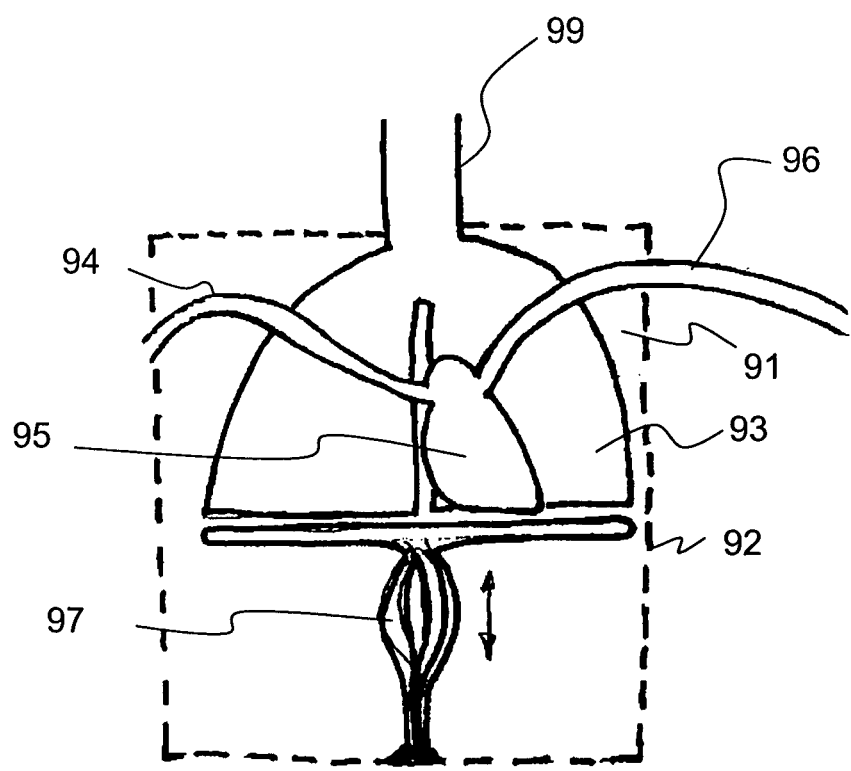
Figure 3:
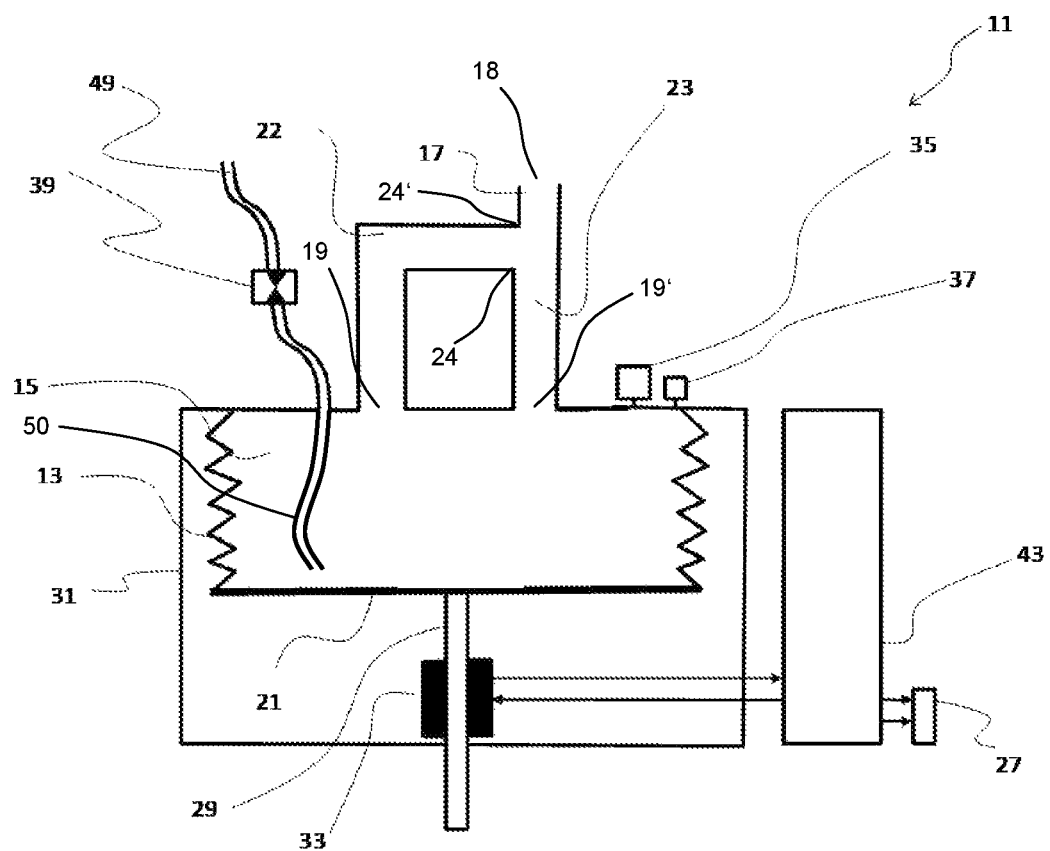

FIG. 1 shows a graph of a Venegas equation
FIG. 2 shows schematically a simplification of a chest compartment of a human being.
FIG. 3 shows schematically an embodiment of an apparatus according to the invention
FIG. 4 shows schematically a further embodiment of an apparatus according to the invention.

DETAILED DESCRIPTION OF THE FIGURES

The diagram shown in FIG. 1 is related to the Venegas equation, an equation relating mathematically the pressure and the volume of a gas in a compartment, its x-axis containing the pressure values in cm $H_2O$ and its y-axis containing the volume values in ml. The graph changes its form depending on the parameters a, b, c and d.

FIG. 2 shows a simplified schematic of the lung physiology. The reference numeral 91 is related to a chest room within a chest wall 92. Within this chest room 91 are three organs, that is the lung 93 with two lung halves, the heart 95 (naturally also with two ventricles and two atria, that are not shown), and the lung muscles 97 simplified as a kind of diaphragm. The heart 95 is arranged between a venous blood vessel 94 and an arterial blood vessel 96. The pulmonary circulation is not shown. Further an airway 99 is shown, connecting the lung to the exterior of the chest room. The forces relevant for the cardio-pulmonary interaction therefore are defined if the airway resistance, the compliance of the chest wall 92, the muscle activity of the lung muscles 97, the blood pressure, the gas pressure in the lung, the condition of the heart, as well as gas parameters as the $O_2$ and the $CO_2$ concentration in the gas filling the lung are known and are interdependently related in a manner that is called human physiology.

Such simplified lung is technically reproduced as shown in FIG. 3.

In the embodiment of FIG. 3 a chest room as well as a chest wall is left out. The technical reproduction as shown in FIG. 3, generally called apparatus 11 with a lung simulator, has at least one lung chamber 13 with air compartments configured as a bellows 15. On such bellows, corresponding tubes 22 and 23 having different volumes are arranged to be joined at the airway 17. The airway 17 comprises one opening 18 to which a ventilator may be connected. In FIG. 3 and FIG. 4 the cross-sectional area of the tube 22 between the tube end points 24 and 24' and the cross-sectional area of the tube 23 at end point 24 and extending perpendicular to the longitudinal axis of the tube 23 mark the transition from the air conduits, i.e. tube 22 and tube 23, to the airway 17. A base 21 of the bellows 15 can move downwardly when air is introduced through the airway opening 18 to the air chamber 13. Connected to the base 21 there is an actuator, for example a linear motor 33.

Tubes 22, 23 and/or airway tube 17 may be constructed in such a way that their total volume and/or their individual volumes are adjustable, i.e. controllable by an experimenter.

A control unit 43 is provided in the form of a microprocessor board that reads the values of the sensors and controls the position of the base 21 according to the equations given in the text.

Further the embodiments are provided with a mass flow controller 39 to inject $CO_2$ into the bellows 15 depending on the dead space desired, and conduit 49 connecting a tracer gas source, e.g. a $CO_2$ tank or supply, with the valves 39'. Conduit tube 49 may advantageously penetrate into the air chamber 15. At least the end 50 of the conduit tube 49, which penetrates into the air chamber 15, is elastic so that it may be pushed by base 21. The opening of end 50 is located close to the base 21 (also during movement of the base 21) and closer to the base than to the outlets 19 and 19', where the air conduits 22 and 23 contact the air chamber 15.

A further simplified lung is technically reproduced as shown in FIG. 4.

In the embodiment of FIG. 4 a chest room as well as a chest wall is left out. The technical reproduction as shown in FIG. 3, generally called apparatus 11 with a lung simulator, has at least two lung chambers 13 and 13' with air compartments configured as a bellows 15 and 15'. On each bellows, a corresponding tube 22 and 23 having different volume are arranged to be joined at the airway opening 18 to which a ventilator may be connected. A base 21 of the bellow 15 can move downwardly when air is introduced through the airway opening 18 to the air chambers 13 and 13'. Connected to the base 21 there is an actuator, for example a linear motor 33.

A control unit 43 is provided in the form of a microprocessor board that reads the values of the sensors and controls the position of the base 21 according to the equations given in the text.

Further the embodiments are provided with a mass flow controller 39 to inject $CO_2$ into the bellows 15 and 15' depending on the dead space desired, and conduits 49 and 49' connecting a $CO_2$ tank or supply with the valves 39 and 39'.

Conduit tubes 49 and 49' may advantageously penetrate into the air chambers 15 and 15' similarly as depicted in FIG. 3 for conduit tube 49. At least the ends 50 and 50' of the conduit tubes 49 and 49', which penetrate into the air chambers 15 and 15', are elastic so that the tubes 49 and 49' may be pushed by base 21. The openings of the penetrating conduit tubes 49 and 49' are located close to the base 21 (also during movement of the base 21) and closer to the base than to the outlets 19 and 19' of the air conduits 15 and 15'.

In the embodiments according to FIGS. 3 and 4, the disclosed invention encompasses a mechanical frame 31 with bellows 15 and 15', respectively, attached to that frame 31 and fitted, for example, with a standard 22 mm connector as an airway opening 18, one single linear motor assembly 33 with integrated displacement sensor and long range of motion, typically 30 cm, an oxygen sensor 35 to measure the oxygen content within the bellows 15, a pressure sensor 37 to measure the pressure within the bellows 15, a mass flow controller (not shown) to inject $CO_2$ into the bellows 15 or 15', respectively, depending on the valve settings, and a control unit 43 forming at least a part of a central processing unit (CPU) and software the CPU is working with containing a physiological model with a plurality of pathological models. With this software and the CPU 43 the different characteristic equations and parameters of the equations given further down are applied in order to simulate the different patient types and pathologies. The control unit is fitted with at least one communication port 27 to modify the said parameters externally, for example using a PC, in order to create different sets of patients and pathologies.

Above examples are intended to illustrate the art of the present invention and are not intended to limit the scope of the claims below.

Description of Use

The physical lung model described herein can be connected directly to a ventilator or a breathing support device. The results of the ventilation on lung mechanics and gas exchange, including hemodynamic effect, can then be assessed immediately and directly on the physical lung model. A pulse oximeter can be attached to monitor the oxygen saturation and hemodynamic effects of the ventilation. Alternatively, a display unit can be used.

A trainee can judge the result of ventilation immediately, respond to it, and follow the course of a patient in any given curriculum selected by the assigned trainer. Such sophisticated training is hitherto not available due to the lack of a pertinent patient simulator. The present invention fills this gap.

If the attached ventilator is closed-loop controlled, step responses can be measured by selection of a parameter set that simulates lung collapse, loss of blood, or increase in metabolic rate via increase of $CO_2$ production. Such step response measurements are required by IEC/ISO 60601-1-12 but can currently not be measured because of lack of a suitable physical lung model. The present invention fills this gap too.

Another use of the physical lung model is to test on-airway sensors such as flow transducers or gas analyzers. For this purpose, the devices under test can be connected directly to the physical lung model described herein. Different breathing patterns can be created with the lung model thereby providing reference signals for the devices under test. The signals of the devices under test can be compared with the signal of the lung model which serve as reference, and analyzed for accuracy and precision.

Description of the Function of the Embodiments and Examples

The control unit does not only read the sensor values several times per second. The control unit also controls the motor or motors at the same rate it reads the sensor samples with an electrical current driver according to the equations given above depending on the lung pathology and respiratory muscle activity chosen by the user. Any attached ventilator, whether it is a high level medical ventilator with closed loop technology or a CPAP device or another respiratory support device, will interact with the settings of the invention and create gas flow into or out of the lung simulator. The result of this gas movement is recorded by virtue of the displacement sensor (integrated displacement sensor) and converted into flow and volume by multiplication of the displacement by the active area within the bellows as follows:

$$V_L(t) = x(t) * A_L + V_{RC} \quad [19]$$

Where x(t) is the current position of the bellows. Flow is simply the first derivative of the above equation. Instantaneous pressure within the bellows $P_{bellows}$ is measured. Volume, flow, and pressure are stored and used for the following calculations. The values can be exported to an attached PC for documentation. Next, the instantaneous pressure within the bellows is measured and the instantaneous value for $P_{cardio}$ is calculated as given in Equation 17 and the resulting instantaneous value for the current amplitude for the pulse oximeter plethysmogram is calculated according to Equation 18. The instantaneous $A_{PO}$ values are sent to the peripheral circulation compartment to control the emitted light from that circulation compartment.

In one embodiment, the control unit controls the value of dead space by injecting the $CO_2$ into either one of the at least two air compartments. The control unit also adjust the mass flow controller which delivers pure $CO_2$ gas into the bellows to simulate $CO_2$ production $V'_{CO2}$.

For each breath, the actual value of $V_{Lee}$ and $P_{O2}$ is measured and the resulting oxygen saturation $S_{aO2}$ is calculated according to equation 15. The control unit sends the $S_{aO2}$ to the peripheral circulation compartment which then adjusts the light intensity accordingly and thereby simulates oxygen saturation.

A breath is defined, for example, as a change in lung volume that is larger than the dead space Vd.

In a further embodiment, the control unit controls a restrictor at the entrance to the bellows to control the resistance to flow, $R_{aw}$. $R_{aw}$ is calculated from measured levels of pressure across the restrictor and measured displacement of the bellows.

The control unit reads the values of the lung model parameters from an internal memory (default values), from an attached user interface as for example a keyboard, or from a data interface, for example an RS232 or ETHERNET connection. The parameters of the model are $C_W$, $V'_{CO2}$, level of hemodynamic stability, respiratory activity ($P_{0.1}$), form and amplitude of $P_{musc}(t)$, minimal Venegas parameters $a_{min}$, $b_{min}$, c,d, collapse/recruitment threshold $P_{threshold}$, $RC_{lh}$, $RC_c$, $FRC_{pred}$, $T_{delay}$, dead space Vd, recruitment factor Cr, and the parameters inside table1. Typically, also the time and pressure dependency of the Venegas parameters "a" and "b" are transmitted. Barometric pressure and temperature can be either transmitted via the data interface or measured directly by the lung model by using appropriate sensors. The bellows size, type, and the associated residual volume of the collapsed bellows $V_{RC}$, can be read via the data interface or by virtue of an inherent code that can be read by the control unit from the bellows label. The parameter $A_L$, i.e. the active surface of the bellows, can be derived thereof.

The present invention allows to model normal respiration, the lung in disease, as well as a combination thereof by adjusting said lung model parameters, as illustrated by the following examples.

Normal lungs: by injection of $CO_2$ into air chamber which connects to the airway opening with low volume tube, for example 50 ml for adults. This yields a total of 100 ml dead space.

Pulmonary embolism: by injection of $CO_2$ into air chamber which connects to the airway opening with high volume tube, for example 100 ml for adults. This yields a total of 200 ml dead space.

Paralysis (no muscle activity) or week breathing: by setting $P_{musc}(t)$ to zero or to very low values, for example −3 hPa for 1 second and to 0 for 2 seconds.

Strong respiratory activity: by letting $P_{musc}(t)$ increase to −10 hPa within 0.1 second and keeping it there 1 second and thereafter increasing $P_{musc}(t)$ to 10 hPa for 1 second and repeating this process yielding 30 strong breaths per minute.

Stiff lungs: by setting the Venegas parameters a, b, and c to low values, for example 20% of predicted FRC, 40% of predicted FRC, and 30 hPa, respectively.

Lung collapse: by setting the Venegas parameters "a" and "b" to low values, for example 1000 ml and 2000 ml, respectively and/or by letting "a" and "b" collapse with time down to a minimal value of, for example 700 ml and 1500 ml, respectively. As a result of such manipulation of the basic parameters, the oxygenation of the arterial blood will become worse, since $S_{aO2}$ depends on the level of $V_{Lee}$. The degree of such deterioration is highest without external respiratory support and will improve with external respiratory support, for example with positive end expiratory pressure.

Weak circulation: if there is not enough blood in the vessels, the heart, and particularly a weak heart, will not be able to completely counteract the forces caused by a ventilator. This deficiency can be made visible by making the Pulse Oximetry Plethysmogram variation $POP_v$ dependent on intra-thoracic pressure. Intra-thoracic pressure is a combination of the forces within the thoracic cavity and the forces applied to the thoracic cavity. Intra-thoracic pressure is created by the recoil forces of lung and chest wall plus the action of the respiratory muscles and the pressure applied by a ventilator. Lung recoil pressure, chest wall elasticity and respiratory muscle activity are determined by the lung model itself. They can said to be "internal forces". In contrast, the pressure applied by a ventilator or respiratory support device is an "external force", which is independent on the lungs. The advantage of the illustrated embodiment of the present invention is that the two sources of force interact with each other as described by equation 18. The pressure $P_{cardio}$, derived from the low pass filtered pleural pressure surrogate $P_{pl}$, can therefore be taken as predictor of $POP_v$ in different hemodynamic conditions, as described in the Table 1:

TABLE 1

Example of link between level of hemodynamic stability and $POP_v$ for three different levels of simulated hemodynamic stabilities: "Stable hemodynamics", "Moderate instability", and "Severe instability"

| Stable hemodynamics | | Moderate instability | | Severe instability | |
|---|---|---|---|---|---|
| $P_{cardio}$ | $POP_v$ | $P_{cardio}$ | $POP_v$ | $P_{cardio}$ | $POP_v$ |
| 10hPa | 6% | 10hPa | 10% | 10hPa | 15% |
| 20hPa | 7% | 20hPa | 13% | 20hPa | 20% |
| 30hPa | 8% | 30hPa | 30% | 30hPa | 40% |

Although the present invention has been described in considerable detail and with reference to certain versions thereof, other versions are possible.

In summary, the invention relates to a lung simulator apparatus, as well as to a method to ventilate a lung simulator with a ventilator. The invention solves the problem of such apparatuses, that physiology is not accurately represented, by the new step of calculating a change of values of the physiological parameters dependent on the measured values and based on a physiological model defining the dependencies between the values of the physical and the physiological parameters. An embodiment of such apparatus has an adjustable dead space, a motor driven set of bellows and controls a cardio-vascular interface presenting cardio-pulmonary parameters.

Definitions of Abbreviations:
a end expiratory volume of the lung compartment in the Venegas equation
$A_L$ is the active surface of the bellows
$A_{PO}(t)$ the instantaneous effect of the actual lung pressure on the actual amplitude of the pulse
ARDS acute respiratory distress syndrome
b breathing volume of the air chamber (lung) in the Venegas equation
c parameter of the Venegas equation
$C_a$ the oxygen content of the arterial blood
$C_c$ the oxygen content of the capillary blood,
$C_v$ the oxygen content of mixed venous blood
$C_L$ lung part of $C_{rs}$,
$C_r$ determines how much recruitment can be done
$C_{rs}$ total respiratory compliance
$C_w$ chest wall part of $C_{rs}$,
COPD chronic obstructive lung disease
d parameter of the Venegas equation
e natural constant
FRC functional residual capacity,
$FRC_{pred}$ predicted FRC, typically for a healthy lung of a certain patient size
$i_{corr}$ corrected voice coil current
$i_{vc}$ voice coil current
k a constant for a particular voice coil
ln the natural logarithm
$P_{aw}$ pressure at the airway opening
$P_{bellows}$ pressure within the compressible compartments
$P_{cardio}$ low-pass filtered pleural pressure
$P_{diff}$ partial pressure at which the blood is completely saturated
$P_L$ theoretical lung pressure
$P_{musc}$ muscular activity
$P_{O2}$ partial pressure of O2 in the air chamber
$P_{pl}$ pleural pressure
$P_{threshold}$ collapse/recruitment threshold pressure
$P_{vc}$ pressure of the voice coil
$POP_v$ Pulse-Oximetry Plethysmogram variation
$Q_s$ the ml/min of blood not exchanging gas with the lung
$Q_t$ the total blood flow
$R_{aw}$ airways resistance
$RC_c$ the time constant of collapse and recruitment
$RC_{lh}$ the time constant of the lung-heart transfer function or the time constant with which the lung pressure impacts the blood pressure
$S_{aO2}$ oxygen saturation in the arterial blood
$S_c$ oxygen saturation in the capillaries,
$S_v$ oxygen saturation in the venous blood
$S_c$ oxygen saturation in the alveolar capillaries
(t) as a function of time
$V'_{CO2}$ CO2 release
$V_{dS}$, Vd. dead space
$V_L$ volume inside the lungs
$V_{Lee}$ actual lung volume at the end of exhalation
$V_{RC}$ the volume within the bellows when they are fully compressed
x(t) is the current position of the bellows as a function of time
$z_{lh} = dt/(RC_{lh}+dt)$ defining the responsiveness on a recruitment maneuver

The invention claimed is:

1. A physical lung simulator apparatus, comprising:
an air chamber defining an expandable and contractible air chamber volume for receiving an exchangeable gas;
a first air conduit and a second air conduit, each emanating from the air chamber and connecting in parallel to a first end of a common air tube having a single opening at a second end, the first air conduit having a first volume and a second air conduit having a second volume different than the first volume to simulate dead space volume; and
a gas exchange element connected to the air chamber for injecting a tracer gas into the air chamber.

2. The apparatus of claim 1, wherein the first volume of the first air conduit differs from the second volume of the second air conduits by at least 1 ml.

3. The apparatus of claim 1, further comprising a controller for affecting or controlling injection of the tracer gas into the air chamber.

4. The apparatus of claims 2, wherein the first volume of the first air conduit differs from the second volume of the second air conduit by between about 10 ml and 100 ml.

5. The apparatus of claim 1, wherein the common air tube comprises at least one sensor for analyzing the tracer gas passing through the common air tube.

6. The apparatus of claims 1, wherein the first volume of the first air conduit and the second volume of the second air conduit are selectively adjustable.

7. The apparatus of claim 1, wherein the gas exchange element comprises a structure that allows penetration of an injecting device.

8. The apparatus of claim 1, further comprising a mechanical actuator for increasing or reducing the air chamber volume of the air chamber.

9. A method of simulating physical lung function, comprising:
filling an adjustable volume air chamber with a first gas via a first air conduit and a second air conduit arranged in parallel;
injecting a second gas into the adjustable volume air chamber via a gas exchange element connected to the expandable and contractible air chamber; and expelling the first and second gases out of the adjustable volume air chamber via the first and second air conduits in parallel, wherein the first air conduit has a first volume and said second air conduit has a second volume, the first volume being different than the second volume to simulate dead space volume, merging the gases emanating from the gas chamber via the first and second air conduits in a common air tube and expelling the first and second gases via a first opening of the common air tube and further expelling the first and second gases via a second opening of the common air tube.

10. The method of claim 9, wherein a first gas volume of the first gas is at least two times a second gas volume of the second gas.

11. The method of claim 9, further comprising providing the second gas as an inert gas.

12. The method of claim 9, further comprising applying a contracting or expanding force to the adjustable volume air chamber as a function of at least one of time or volume of the adjustable volume air chamber.

13. The method of claim 9, further comprising testing a medical ventilator.

14. A method of simulating physical lung function, comprising:
   filling a first adjustable volume air chamber with a first gas via a first air conduit and filling a second adjustable volume air chamber with the first gas via a second air conduit;
   injecting a second gas into the first air chamber via a first gas exchange element connected to the first air chamber; and
   expelling the first and second gases out of the first and second air chambers via the first and second air conduits in parallel, wherein the first air conduit has a first conduit volume and the second air conduit has a second conduit volume, the first conduit volume being different than the second conduit volume to simulate dead space volume, merging the first and second gases emanating from the first and second air conduits in a common air tube and expelling the gases via one opening at an end of the common air tube.

15. The method of claim 14, wherein a first gas volume of the first gas is at least two times a second gas volume of the second gas.

16. The method of claim 14, further comprising providing the second gas as an inert gas.

17. The method of claim 14, further comprising applying a contracting or expanding force to the first adjustable volume air chamber as a function of at least one of time or volume of the first air chamber.

18. The method of claim 14, further comprising testing a medical ventilator.

19. A physical lung simulator apparatus, comprising:
   a first adjustable volume air chamber for receiving an exchangeable gas and a second adjustable volume air chamber for receiving the exchangeable gas;
   a first air conduit and a second air conduit, the first air conduit emanating from the first adjustable volume air chamber, the second air conduit emanating from the second adjustable volume air chamber and the first and second air conduits connected in parallel to a first end of a common air tube having a single opening at a second end, the first air conduit having a first volume and the second air conduit having a second volume different than the first volume to simulate dead space volume; and
   a first gas exchange element connected to the first adjustable volume air chamber for injecting a tracer gas into the first adjustable volume air chamber.

20. The apparatus of claim 19, wherein the first volume of the first air conduit differs from the second volume of the second air conduit by at least 1 ml.

21. The apparatus of claim 19, further comprising a second gas exchange element connected to the second adjustable volume air chamber for injecting the tracer gas into the second adjustable volume air chamber.

22. The apparatus of claim 19, further comprising a controller for affectinq or controlling the tracer gas injection into at least one of the first and second adjustable volume air chambers.

23. The apparatus of claims 19, wherein the first volume of the first air conduit differs from the second volume of the second air conduit by between about 10 ml and 100 ml.

24. The apparatus of claim 19, wherein the common air tube comprises at least one sensor for analyzing the tracer gas passing through the common air tube by measuring a partial pressure of the tracer gas.

25. The apparatus of claims 19, wherein the first volume of the first air conduit and the second volume of the second air conduit are each selectively adjustable.

26. The apparatus of claim 19, wherein the first gas exchange element comprises a structure that allows penetration of an injecting device.

27. The apparatus of claim 19, further comprising a mechanical actuator for increasing or reducing a first air chamber volume of the adjustable volume air chamber.

* * * * *